United States Patent
Hendriks

(10) Patent No.: US 7,564,763 B2
(45) Date of Patent: Jul. 21, 2009

(54) OPTICAL ARRANGEMENT

(75) Inventor: Bernardus Hendrikus Wilhelmus Hendriks, Eindhoven (NL)

(73) Assignee: Koninklijke Phililps Electronics N.V., Eindhoven (NL)

( * ) Notice: Subject to any disclaimer, the term of this patent is extended or adjusted under 35 U.S.C. 154(b) by 403 days.

(21) Appl. No.: 10/563,648

(22) PCT Filed: Jul. 1, 2004

(86) PCT No.: PCT/IB2004/051081

§ 371 (c)(1),
(2), (4) Date: Jan. 6, 2006

(87) PCT Pub. No.: WO2005/006320

PCT Pub. Date: Jan. 20, 2005

(65) Prior Publication Data

US 2006/0251378 A1    Nov. 9, 2006

(30) Foreign Application Priority Data

Jul. 9, 2003    (EP) .................................. 03102066

(51) Int. Cl.
  *G11B 7/135*    (2006.01)
(52) U.S. Cl. .............................. 369/112.04; 369/112.07
(58) Field of Classification Search ............ 369/112.26, 369/112.01, 112.15, 112.22, 44.12, 121, 369/112.04, 112.06; 359/574, 565
See application file for complete search history.

(56) References Cited

U.S. PATENT DOCUMENTS

| 5,260,828 | A * | 11/1993 | Londono et al. ............. 359/565 |
| 6,278,548 | B1 * | 8/2001 | Shimano et al. ............. 359/565 |
| 6,853,614 | B2 * | 2/2005 | Kim et al. ............... 369/112.01 |
| 6,873,463 | B2 * | 3/2005 | Nakai ....................... 359/574 |
| 7,126,904 | B2 * | 10/2006 | Nishiwaki et al. ........ 369/112.26 |
| 2001/0006429 | A1 | 7/2001 | Wals et al. |

FOREIGN PATENT DOCUMENTS

| EP | 0840144 A1 | 5/1998 |
| EP | 0840144 A1 | 6/1998 |
| EP | 1102250 A2 | 5/2001 |
| EP | 1102250 A2 | 5/2001 |
| EP | 1313095 A2 | 5/2003 |

(Continued)

OTHER PUBLICATIONS

Benno H. W. Hendriks et al; "Application of Nonperiodic Phase Structures in Optical Systems", Applied Optics, vol. 40, No. 35, Dec. 10, 2001, XP002264634.

*Primary Examiner*—Hoa T Nguyen
*Assistant Examiner*—Kim-Kwok Chu

(57) ABSTRACT

An optical system is described for scanning optical record carriers of different types. The optical system includes a compensator having a number of optical elements (NPS1, NPS2). The optical elements (NPS1, NPS2) are non-periodic phase structures (NPS) having annular areas separated by steps, forming a non-periodic pattern of optical paths of different lengths. By including these multiple optical elements (NPS 1, NPS2) having NPS surfaces in the lens system of an optical system, it is possible to compensate for the effect of variation of a parameters such as temperature, angle of incidence, polarisation of radiation incident on the system and wavelength of radiation, without causing sensitivity to variation of another such parameter.

9 Claims, 1 Drawing Sheet

FOREIGN PATENT DOCUMENTS

Figure 1:
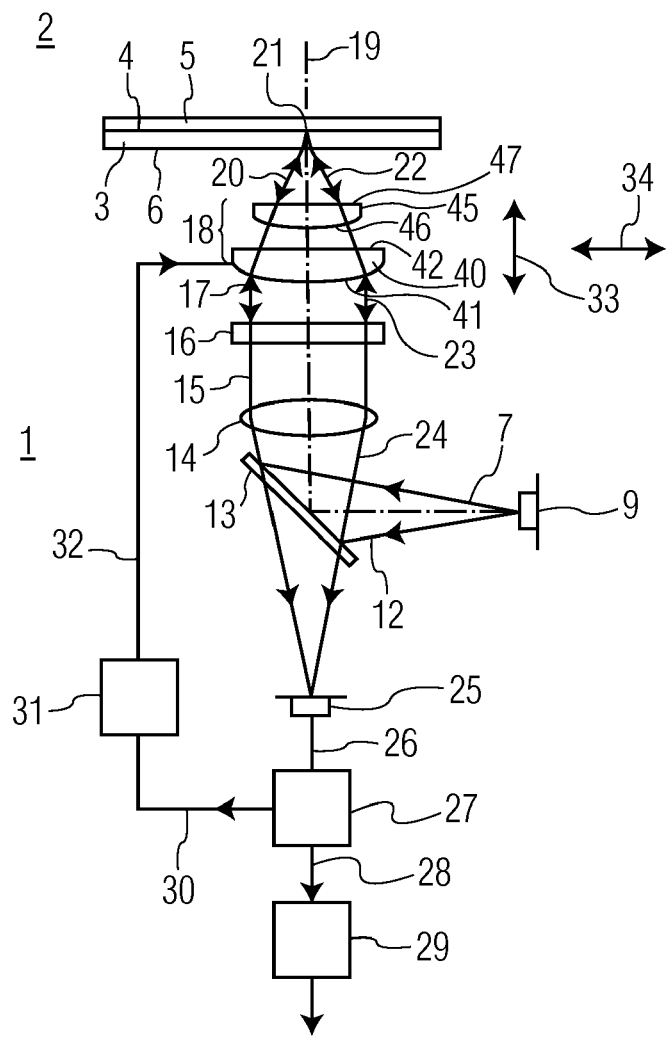

| | | | |
|---|---|---|---|
| EP | 1313095 | A2 | 5/2003 |
| GB | 2369952 | A | 6/2002 |
| JP | 2001235678 | A | 8/2001 |
| JP | 2002116314 | A | 4/2002 |
| WO | 9819196 | | 5/1998 |
| WO | WO9819196 | | 5/1998 |
| WO | 0148746 | A1 | 7/2001 |
| WO | 0148748 | A1 | 7/2001 |
| WO | WO0148745 | A2 | 7/2001 |
| WO | WO0148746 | A1 | 7/2001 |
| WO | WO0148748 | A1 | 7/2001 |
| WO | 0229797 | A1 | 4/2002 |
| WO | 0229798 | A1 | 4/2002 |
| WO | WO0229797 | A1 | 4/2002 |
| WO | WO0229798 | A1 | 4/2002 |
| WO | 0241307 | A1 | 5/2002 |
| WO | WO0241307 | A1 | 5/2002 |
| WO | 02082437 | A1 | 10/2002 |
| WO | WO02082437 | A1 | 10/2002 |
| WO | 2005006320 | A1 | 1/2005 |

\* cited by examiner

OPTICAL ARRANGEMENT

The present invention relates to an optical arrangement, particularly to an optical arrangement including an optical element for use in scanning optical record carriers of different types, or to an optical element in an optical system such as a camera.

Progress in the field of optical reading and recording has resulted in the introduction of increasingly complex systems having extended capabilities, such as higher information capacity and density. Unfortunately, with these extended capabilities the margins of tolerance of the systems decrease.

An example of a new optical system is the Blu-ray Disc system (BD) which is a new optical recording protocol. The BD system uses a radiation beam with a wavelength of approximately 405 nm, a numerical aperture (NA) of 0.85 and a spherical aberration compensation for a record carrier of substrate thickness of 0.1 mm. When this system is compared with the Digital Versatile Disk system (DVD) which uses a radiation beam of wavelength 650 nm, a numerical aperture of 0.6 and a record carrier substrate thickness of 0.6 mm, the increase in NA and the decrease in wavelength makes the margins of tolerance for BD much smaller than for DVD. The BD system, capable of significantly increase data density (capable of recording 25 GB discs) is much more sensitive to wavelength variations that may arise when the temperature of the laser varies, or the wavelength of the laser varies from batch to batch by a few nm.

In another example in the field of optical recording, information is stored on an information layer of an optical record carrier such as a compact disc (CD) or a digital versatile disc (DVD). An increase in the density of information which can be stored on such an optical disc can be achieved by decreasing the size of a focal spot of a radiation beam which is used to scan the information layer of the optical disc. Such a decrease in spot size can be achieved by using a shorter wavelength and a higher numerical aperture (NA) of the radiation beam. However, increased resolution tends to reduce tolerances which apply to optical elements within an optical system. These reduced tolerances cause the focal spot of the radiation beam for scanning the optical disc to be more susceptible to degradation in quality.

Optical systems may be designed to be compatible with different types of optical disc, for example both a CD and a DVD. In such a system a separate radiation beam with an appropriate and different wavelength for scanning each type of disc is used. Each radiation beam is generally directed along a common portion of an optical path within the system along which lies optical elements for focusing the radiation beam to a focal spot on the optical disc. A problem arises during the design of these optical elements, for example an objective lens, as it is needed to ensure that the radiation beam being used to scan the type of optical disc is focused to a spot of sufficient quality on the optical disc.

This problem is caused in part by the different wavelength and numerical aperture of the radiation beam for scanning each type of disc, but also to a difference between an information layer depth of a transparent cover layer of a first and a second type of optical disc through which the radiation beam passes. This cover layer modifies the radiation beam passing through the cover layer. This modification is considered when designing the precise specifications of the objective lens so that a wavefront deviation is introduced into the radiation beam which compensates the modification by the cover layer and ensures that the focal spot achieved is of the highest quality. In the case of a CD and a DVD, the thickness of this cover layer is approximately 1.2 mm and 0.6 mm respectively. As a result, when an objective lens designed to focus a radiation beam for scanning a DVD to a focal spot is used to scan a CD, a wavefront deviation comprising a spherical aberration is introduced into the radiation beam for compensating the wavefront deviation introduced by the cover layer of the DVD. As the cover layer of the CD is of a different depth than that of the DVD the focal spot is of a reduced quality.

As described above, parameters of the optical system affecting the quality of the focal spot include environmental influences, for example a change in temperature, on the optical system. An optical system of this type generally comprises a collimator lens for modifying the vergence of the radiation beam scanning the optical disc and an objective lens for focusing the radiation beam to the focal spot on the optical disc. The optical system is designed for use at a standard operating temperature and the precise specifications of the optical elements including the collimator and the objective lens are determined based upon this standard temperature.

With a variation from this standard temperature the properties of the optical elements are affected, leading to a decrease in the quality of the focal spot of the radiation beam. In the case of the objective lens a change in temperature causes a refractive index of a material from which the lens is formed, a shape of the lens and a dimension of the lens to vary. Additionally this variation in temperature causes a slight change in a wavelength of the radiation beam being used to scan the disc to occur. The consequent decrease in the quality of the focal spot is typically in the form of a wavefront deviation comprising a spherical aberration of the radiation beam.

The unwanted aberrations arising when the wavelength varies in a certain range can be reduced using a periodic notched lens structure, as described in the article "An Objective with a Phase Plate", Optics and Spectroscopy, volume 6 (1959) pp. 126-133 by A. Tudorovskii. The notched lens described in this article can be viewed as a combination of a normal lens and a diffractive structure. Each step in the lens introduces a phase step in the wavefront of the transmitted beam equal to a multiple of the wavelength. The precise method by which the unwanted aberrations can be reduced is discussed in full in the article. However, there is a significant drawback with using this method in the optical systems described above, namely that although the notched lens structures can make an optical system achromatic, they generally lead to a rather large number of small zones. This can make the structures difficult to manufacture, as a high degree of accuracy is required to maintain the fine periodic zones of the structure.

Use of a non-periodic phase structure (NPS) can reduce some of the problems associated with the notched lens device described above. An NPS has a phase structure comprising annular areas forming a non-periodic pattern of optical paths of different lengths. An NPS commonly introduces a wavefront deviation to a radiation beam passing through the NPS and may be used to modify or correct a wavefront deviation of a radiation beam by introducing a further wavefront deviation.

International patent application WO 01/48745 describes an optical head for scanning one type of optical record carrier. At a design temperature an objective lens is arranged to focus a radiation beam to a spot on the optical record carrier. At a temperature other than the design temperature the objective lens introduces a wavefront deviation into the radiation beam.

An NPS is arranged to introduce a further wavefront deviation into the radiation beam such that the wavefront deviation introduced by the objective lens is reduced.

International patent application WO 02/082437 describes an optical scanning device for scanning optical record carriers of a first, second and a third different type with a radiation beam of a first, second or third different wavelength respectively. An objective system is provided for focusing the radiation beam upon the type of optical record carrier being scanned. Additionally an NPS is provided in a path of the radiation beam. The NPS approximates a flat wavefront for the first radiation beam, a spherical aberration wavefront at the second radiation beam and a flat or spherical aberration wavefront at the third radiation beam.

International patent application WO 02/29798 describes an optical device for scanning optical record carriers of a first and a second type with a first and a second radiation beam respectively. Each radiation beam has a different numerical aperture. Both devices include an NPS which does not affect the first radiation beam but introduces a spherical aberration into the second radiation beam. This introduced spherical aberration is for compensating a spherical aberration resulting when scanning through a difference in a cover layer thickness of the first and second optical record carriers.

International patent application WO 01/48746 describes an optical device for scanning optical record carriers where slight variations in wavelength emitted by a laser diode, usually caused by slight difference between laser diodes from different batches, are compensated for using a single NPS. Using radiation with a wavelength different from the wavelength for which the optical device was optimised will, in general, give rise to a certain amount of spherochromatism, hence a certain amount of spherical aberration proportional to the difference in wavelengths which will be corrected by the NPS.

It is a drawback of NPS devices, that although the NPS can correct for one variation in a given parameter, the lens and NPS together become sensitive to variations in other parameters. For example, if an NPS is used to compensate for thermal variations in the objective system, this can cause the optical device to become sensitive to wavelength variations. These wavelength variations may arise from the fact that the wavelength of the laser used in the optical system varies by a few nm from sample to sample.

In an optical pickup for optical recording, making the objective lens athermal with an NPS may cause unwanted wavefront aberrations depending on the wavelength of the laser used. This wavelength dependence is undesirable and can limit the application of the NPS for thermal correction.

Additionally, it is a further drawback of NPS devices that although an NPS can make an objective lens achromatic for zero field angles, at non-zero field angles the compensation becomes dependent on the field angle. As a result, the compensation at larger field angles is no longer optimal and a camera lens or a zoom lens made achromatic using an NPS is not optimal for large field of view systems.

It is one object of the present invention to provide improvements in performance of objective lenses in optical systems in order to overcome the above-mentioned limitations.

According to the invention there is provided an optical arrangement for interacting with a radiation beam, the optical arrangement comprising an optical system and a compensator, the compensator including a first optical element, the first optical element having a phase structure comprising stepped annular areas forming a non-periodic pattern of optical paths of different lengths, the compensator being arranged to generate:

a first wavefront deviation introduced by the variation of a first parameter during interaction of the radiation beam with the compensator, the first wavefront deviation being arranged to counteract a wavefront deviation introduced by the variation of the first parameter during interaction of the radiation beam with the optical system; and a second wavefront deviation introduced by the variation of a second, different, parameter during interaction of the radiation beam with the compensator, characterised in that the compensator further includes a second optical element having a phase structure comprising stepped annular areas forming a non-periodic pattern of optical paths of different lengths, the second optical element being arranged to reduce said second wavefront deviation.

The effect of the first and second wavefront deviations is, in each case, quantifiable in terms of a root mean square optical path difference (RMS OPD) of the radiation beam. By reducing, in terms of the RMS OPD, the second deviation, the compensator has the effect of increasing the resolution of the beam when focused to a spot, under varying conditions, thus increasing tolerances of the system.

By use of the present invention, it is possible to compensate for the effect of variation of the first parameter, which may be a parameter such as temperature, angle of incidence, polarisation and wavelength of radiation, with the compensator without causing a substantial second wavefront deviation (which would otherwise be caused by the first optical element) when the second parameter, which may be another one of those listed above, is varied.

Preferably, the compensator substantially compensates the wavefront deviation introduced by the variation of a first parameter during interaction of the radiation beam with the optical system without increasing a wavefront deviation introduced by the variation of the second parameter during interaction of the radiation beam with the optical arrangement, compared to the case when the compensator is not present. By "substantially compensating", we mean that, over the operative range of the compensator, the RMS OPD of the resultant wavefront deviation is reduced to below the diffraction limit, that is to say below 70 m$\lambda$, and more preferably below 40 m$\lambda$.

Preferably, the two optical elements are made of different materials, whereby various preferred characteristics of a compensator can be realized by forming appropriate relationships between the step heights of the optical elements.

Figure 2:
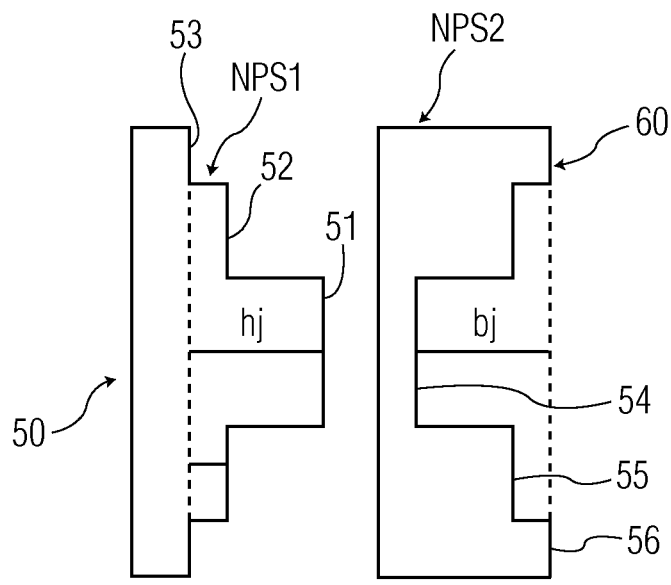

Further features and advantages of the present invention will become apparent from the following description of preferred embodiments of the invention, given by way of example only, made with reference to the accompanying drawings, in which:

FIG. 1 shows a scanning optical device including an optical element in accordance with one form of the invention; and FIG. 2 shows a magnified cross-sectional view of the optical element of FIG. 1.

FIG. 1 shows a device 1 for scanning an optical record carrier 2. The record carrier comprises a transparent layer 3, on one side of which an information layer 4 is arranged. The side of the information layer 4 facing away from the transparent layer 3 is protected from environmental influences by a protection layer 5. The side of the transparent layer 3 facing the device is called the entrance face 6. The transparent layer 3 acts as a substrate for the record carrier by providing mechanical support for the information layer 4. Alternatively, the transparent layer 3 may have the sole function of protecting the information layer 4, while the mechanical support is provided by a layer on the other side of the information layer 4, for instance by the protection layer 5 or by a further information layer and a transparent layer connected to the information layer. Information may be stored in the information layer 4 of the record carrier in the form of optically detectable marks arranged in substantially parallel, concentric or spiral tracks, not indicated in the Figure. The marks may be in any optically readable form, for example in the form of pits or areas with a reflection coefficient or a direction of magnetization different from their surroundings, or any combination of these forms.

The scanning device 1 comprises a radiation source that emits a radiation beam 7. The radiation source shown in FIG. 1 comprises a semiconductor laser 9, emitting a radiation beam 7. The radiation beam 7 is used for scanning the information layer 4 of the optical record carrier 2. A beam splitter 13 reflects the diverging radiation beam 12 on the optical path towards a collimator lens 14, which converts the diverging beam 12 into a collimated beam 15. The collimated beam 15 is incident on a transparent compensator 16, which modifies the wavefront of the collimated beam. The beam 17 coming from the compensator 16 is incident on an objective system 18.

The objective system 18 may comprise one or more lenses and/or a grating. The objective system 18 has an optical axis 19. The objective system 18 changes the beam 17 to a converging beam 20, incident on the entrance face 6 of the record carrier 2. The objective system 18 has a spherical aberration correction adapted for passage of the radiation beam through the thickness of the transparent layer 3. The converging beam 20 forms a spot 21 on the information layer 4. Radiation reflected by the information layer forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25.

The detection system 25 captures the radiation and converts it into electrical output signals 26. A signal processor 27 converts these output signals to various other signals. One of the signals is an information signal 28, the value of which represents information read from the information layer 4. The information signal is processed by an information-processing unit for error correction. Other signals from the signal processor 27 are the focus error signal and the radial error signal 30.

The focus error signal represents the anal difference in height between the spot 21 and the information layer 4. The radial error signal represents the distance in the plane of the information layer 4 between the spot 21 and the centre of the tack in the information layer 4 to be followed by the spot 21. The focus error signal and the radial error signal are fed into a servo circuit 31 which converts these signals to servo control signals 32 for controlling a focus actuator and a radial actuator respectively. The actuators are not shown in FIG. 1. The focus actuator controls the position of the objective system 18 in the focus direction 33, thereby controlling the actual position of the spot 21 such that it coincides substantially with the plane of the information layer 4. The radial actuator controls the position of the objective system 18 in a radial direction 34, thereby controlling the radial position of the spot 21 such that it coincides substantially with the central line of the track to be followed in the information layer 4. The tracks in the Figure run in a direction perpendicular to the plane of the Figure.

FIG. 2 shows a cross sectional view of an exemplary compensator 16 arranged in accordance with an embodiment of the invention. The compensator 16 comprises two complementary NPS elements, NPS1, NPS2. Each NPS element comprises a transparent plate 50, 60, one surface of which includes a phase structure which is rotationally symmetric around the optical axis 19. In this example the phase structure of NPS1 has a central area 51 and two concentric annular areas 52, 53. The annular areas 52, 53 are rings with a height $h_j$ below the height of the central area 51. Similarly the phase structure for NPS2 has a central area 54 and two concentric annular areas 55, 56. The annular areas 55, 56 are rings with a height $b_j$ above the height of the central area 54. It should be noted that the heights of the areas in FIG. 2 are exaggerated with respect to the thickness and radial extent of the plates 50, 60. Furthermore, it should be noted that although the number of zones are three in this particular example, in general it can be any number of zones. The number of zones, and their respective extents, for the area across which the compensation should hold are preferably the same for both NPS elements.

Considering the NPS structures of FIG. 2, let $h_j$ (the height of step j of NPS1) be equal to:

$$h_j = m_j \frac{\lambda}{n_1 - 1} \quad (1)$$

where $m_j$ is an integer, $\lambda$ the wavelength and $n_1$ is the refractive index the material from which the NPS is made.

Similarly, let $b_j$ (the height of step j of NPS2) be equal to:

$$b_j = q_j \frac{\lambda}{n_2 - 1} \quad (2)$$

where $q_j$ is an integer, $\lambda$ the wavelength and $n_2$ the refractive index of the material of which the NPS made.

Note that each step gives rise to phase steps of an integral number of times $2\pi$, when a flat wavefront having zero angle of incidence passes through the NPS.

When the wavelength of the beam changes, the steps of the NPS structures give rise to a phase change (modulo $2\pi$) equal to:

$$\Delta\Phi(\lambda) = -2\pi n_j \left( \frac{1}{\lambda} - \frac{\frac{dn_1}{d\lambda}}{n_1 - 1} \right) \Delta\lambda - 2\pi q_j \left( \frac{1}{\lambda} - \frac{\frac{dn_2}{d\lambda}}{n_2 - 1} \right) \Delta\lambda \quad (3)$$

where $$\frac{dn}{d\lambda}$$

is the dispersion of each respective material.

Similarly, when the temperature of the optical system changes the steps of the NPS structures give rise to a phase change (modulo $2\pi$) equal to:

$$\Delta\Phi(T) = 2\pi m_j \left( \alpha_1 + \frac{\frac{dn_1}{dT}}{n_1 - 1} \right) \Delta T + 2\pi q_j \left( \alpha_2 + \frac{\frac{dn_2}{dT}}{n_2 - 1} \right) \Delta T \quad (4)$$

where α is the thermal expansion coefficient, and $$\frac{dn}{dT}$$ (5)

the temperature coefficient of refractive index, of each respective material.

In examples of the invention, to be described in further detail below, the first NPS, NPS1 is made of PMMA (poly (methyl methacrylate)) and the second NPS, NPS2 is made out of out of BK7 Schott™ glass. In Table 1 the properties of PMMA and BK7 Schott glass are tabulated at 405 nm wavelength.

TABLE 1

| Material | n | dn/dλ | α | dn/dT |
|---|---|---|---|---|
| PMMA | 1.5060 | −0.000114 nm$^{-1}$ | 62.0 10$^{-6}$ | −12.5 10$^{-5}$ |
| BK7 | 1.5302 | −0.000127 nm$^{-1}$ | 7.1 10$^{-6}$ | 0.35 10$^{-5}$ |

Considering the prior art case where only one NPS element is present, and in which the element is made of PMMA, it is found that:

$$\Delta\Phi(\lambda) = -0.01693 m_j \Delta\lambda$$ (5)

$$\Delta\Phi(T) = -0.001163 m_j \Delta T$$

so:

$$\frac{\Delta\Phi(T)/\Delta T}{\Delta\Phi(\lambda)/\Delta\lambda} = 0.0687$$

In the article "Application of nonperiodic phase structures in optical systems" by B H W Hendriks, J E de Vries and H P Urbach in Appl. Opt. 40 (2001), pp 6548-6560, section 2A, it is described how with one NPS element the temperature dependence of an optical arrangement comprising an objective lens and the compensator (NPS) can substantially be reduced. From the third equation in equations (5) above it follows that this NPS produces for 1 nm wavelength shift the same wavefront aberration as for 14.6° C. temperature change. As a result the NPS described, that compensates for thermal effects, is also relatively sensitive to wavefront variations.

In a first embodiment of the invention, a compensator is provided with improved insensitivity to wavelength variation. In this embodiment a compensator is made of two NPS elements NPS1, NPS2, such as that shown in FIG. 2, in which the two elements are made of different materials having different refractive indices and different temperature coefficients of refractive index. In one example the first element NPS1 is made of PMMA and the second element NPS2 is made of BK7 Schott glass.

In order to make the compensator substantially independent of wavelength variations the right hand side of equation (3) is arranged to be substantially equal to zero. Hence the ratio $m_j/q_j$, referred to herein as K, fulfills the requirement:

$$K = \frac{m_j}{q_j} \approx -\frac{\frac{1}{\lambda} - \frac{\frac{dn_2}{d\lambda}}{n_2 - 1}}{\frac{1}{\lambda} - \frac{\frac{dn_1}{d\lambda}}{n_1 - 1}}$$ (6)

Since the right hand side of equation (6) is in general a real number, to provide the NPS structures with an improved main mode of operation, the value of K is preferably rounded off to a rational number to allow it to be written as the division of two integers. For the materials set out in Table 1 it follows that K is approximately equal to −1. This can for instance be approximated by the rational number −1/1, hence K=−1 may be selected. The NPS structures are thus preferably arranged such that $m_j = -q_j$, hence the ratio $K = m_j/q_j = -1$ and thus constant for each zone j of the two NPS structures. For the materials set out in Table 1 it then follows that:

$$\Delta\Phi(\lambda) = 0.0000894 m_j \Delta\lambda$$ (7)

$$\Delta\Phi(T) = -0.001249 m_j \Delta T$$

so:

$$\frac{\Delta\Phi(T)/\Delta T}{\Delta\Phi(\lambda)/\Delta\lambda} = -14.0$$

From this it can be seen that the wavelength dependence of the optical system including the two complementary NPS elements is significantly reduced (in this example by a factor of more than 200) compared to the single NPS case.

Although the case above is one in which an optical system may be made athermal by the presence of the compensator without substantially increasing the wavelength dependence of the optical arrangement, it is possible to achieve other effects by use of the invention.

In a second embodiment of the invention, an optical system can be made achromatic without increasing temperature dependence of the system. In the article "Application of nonperiodic phase structures in optical systems" by B H W Hendriks, J E de Vries and H P Urbach in Appl. Opt. 40 (2001), pp 6548-6560, section 2B, it is described how with one NPS element the chromatic dependence of an optical arrangement comprising an objective lens and the compensator (NPS) can substantially be reduced. From the third equation in equations (5) above it follows that this NPS produces for 14.6° C. temperature change the same wavefront aberration as for 1 nm wavelength shift. As a result the NPS described, that compensates for chromatic effects, is also relatively sensitive to temperature variations.

In this second embodiment a compensator is made of two NPS elements NPS1, NPS2, such as that shown in FIG. 2, in which the two elements are made of different materials having different refractive indices, different thermal expansion coefficients and different temperature coefficients of refractive index. In this embodiment the ratio $K = m_j/q_j$ is arranged such that the right hand side of equation (4) is substantially equal to zero. Hence this ratio is given by:

$$K \approx -\frac{(n_2-1)\alpha_2 + \frac{dn_2}{dT}}{(n_1-1)\alpha_1 + \frac{dn_1}{dT}} \qquad (8)$$

For the materials set out in Table 1 it follows that the right hand side of equation (8) is equal to 0.074. Again, the value of K is preferably rounded off to a rational number to allow it to be written as the division of two integers. In this example, K can for instance be approximated by the rational number 1/13, hence K=1/13 may be selected. The NPS structures are thus preferably arranged such that $m_j=1$ and $q_j=13$ so the ratio $K=m_j/q_j=1/13$ and thus constant for each zone j of the two NPS structures.

Furthermore, according to a third embodiment, by proper choice of materials of the NPS elements and the value K it is possible to make an optical arrangement achromatic and athermal simultaneously. For instance when the optical system is achromatic but not athermal, the compensator as described in the first embodiment can be arranged to produce an optical arrangement that is substantially achromatic and athermal.

In a fourth embodiment of the invention, a compensator is provided with improved insensitivity to field angle variation.

For a nonzero field angle θ of the radiation beam, the steps of the NPS structures give rise to a phase change (modulo 2π) equal to:

$$\Delta\Phi(\theta) = \frac{2\pi m_j}{n_1-1}\left(n_1\left[1-\frac{\sin^2\theta}{n_1^2}\right]^{1/2} - \cos\theta - n_1 + 1\right) + \frac{2\pi q_j}{n_2-1}\left(n_2\left[1-\frac{\sin^2\theta}{n_2^2}\right]^{1/2} - \cos\theta - n_2 + 1\right) \qquad (9)$$

where θ is the field angle.

Equation (9) can be approximated by:

$$\Delta\Phi(\theta) = \pi\theta^2\left(\frac{m_j}{n_1} + \frac{q_j}{n_2}\right) \qquad (10)$$

In examples of the invention, to be described in further detail below, the first NPS, NPS1 is made of PMMA and the second NPS, NPS2 is made of polycarbonate. In Table 2 the properties of PMMA and polycarbonate are tabulated at 550 nm wavelength.

TABLE 2

| Material | n | dn/dλ |
|---|---|---|
| PMMA | 1.494 | −0.0000537 nm⁻¹ |
| Polycarbonate | 1.590 | −0.0001226 nm⁻¹ |

Considering the prior art case where only one NPS element is present which is made of PMMA:

$$\Delta\Phi(\lambda) = -0.012107 m_j \Delta\lambda \qquad (11)$$

$$\Delta\Phi(\theta = 28°) = 0.5022 m_j$$

so:

$$\frac{\Delta\Phi(\theta = 28°)}{\Delta\Phi(\lambda)/\Delta\lambda} = -41.5$$

In the article "Application of nonperiodic phase structures in optical systems" by B H W Hendriks, J E de Vries and H P Urbach in Appl. Opt. 40 (2001) pp 6548-6560 section 2B and 2C it is described how with one NPS element the chromatic dependence of an optical arrangement comprising an objective lens and the compensator (NPS) can substantially be reduced. From the third equation in equations (11) above it follows that the NPS described, that compensates for chromatic effects, is also relatively sensitive to field angle variations.

In the fourth embodiment of the invention, a compensator is made of two complementary NPS elements NPS1, NPS2, such as that shown in FIG. 2, in which the two elements are made of different materials having different refractive indices. In one example, NPS1 is made of PMMA and NPS2 is made of polycarbonate. In order to make the compensator substantially independent of field angle, the right hand side of equation (8) is arranged to be substantially equal to zero. Hence the ratio $K=m_j/q_j$ fulfills the requirement:

$$K \approx -\frac{n_1}{n_2} \qquad (12)$$

For the materials set out in Table 2 it follows that the right hand side of this equation is equal to −0.9396. Again, the value of K is preferably rounded off to a rational number to allow it to be written as the division of two integers. In this example, K can for instance be approximated by the rational number −15/16. The NPS structures are thus preferably arranged such that $16m_j=-q_j$, so the ratio $K=m_j/q_j=-15/16$ and thus constant for each zone j of the two NPS structures. From Table 2 it follows that:

$$\Delta\Phi(\lambda) = -0.02207 m_j \Delta\lambda \qquad (13)$$

$$\Delta\Phi(\theta = 28°) = -0.01706 m_j$$

so:

$$\frac{\Delta\Phi(\theta = 28°)}{\Delta\Phi(\lambda)/\Delta\lambda} = -0.8$$

From these equations it can be seen that the field angle dependence of the optical system including the two complementary NPS elements is significantly reduced (in this example by a factor of more than 50) compared to the single NPS case.

In a fifth embodiment of the invention there is provided a compensator which reduces the field dependence of the system without influencing the chromatic properties of the system. In order to make the compensator substantially independent of wavelength variations the right hand side of equation (3) is arranged to be substantially equal to zero. Hence the ratio $K=-m_j/q_j$ fulfills the requirement set out in equation (6) above.

Furthermore, according to a sixth embodiment of the invention, by proper choice of the materials of the NPS elements and the value of K it is possible to make an optical arrangement achromatic and having reduced field of view dependence simultaneously. For instance when the optical system is achromatic but sensitive for field variations, the compensator as described in the fifth embodiment result in an optical arrangement that is substantially achromatic and having reduced field of view dependence.

In a seventh embodiment of the invention, a compensator is provided which includes more than one complementary NPS element and can be used to compensate for the effect of a change in polarisation in the system. In this embodiment a compensator is made of two NPS elements NPS1, NPS2, such as that shown in FIG. 2, in which the two elements are made of different materials having different refractive indices and different polarization coefficients of refractive index.

A change in the beam polarization p will typically lead to a change in refractive index. For a change in polarization Δp of the radiation beam, the steps of the NPS structures give rise to a phase change (modulo 2π) equal to:

$$\Delta\Phi(p) = 2\pi m_j \left(\frac{\frac{dn_1}{dp}}{n_1 - 1}\right)\Delta p + 2\pi q_j \left(\frac{\frac{dn_2}{dp}}{n_2 - 1}\right)\Delta p \quad (14)$$

where $$\frac{dn}{dp}$$

is the polarization coefficient of refractive index of each respective material.

In the case of a compensator arranged to operate substantially independently of polarization changes, the right hand side of equation (14) is arranged to be substantially equal to zero. Hence the value of K is given by:

$$K \approx -\frac{(n_1 - 1)\frac{dn_2}{dp}}{(n_2 - 1)\frac{dn_1}{dp}} \quad (15)$$

Again, the value of K is preferably rounded off to a rational number to allow it to be written as the division of two integers.

From the embodiments described above it is possible to deduce that the wavefront of the radiation can be modified by use of more than one NPS where the ratios of the step heights $h_j$ and $b_j$ equal a substantially constant parameter K, regardless of the value of j. The value of the constant K can be selected appropriately, depending on the optical function of the wavefront modifier.

There are many other modes that can be compensated for by suitable manipulation of the arrangement of the multiple NPS elements.

It will be appreciated that the embodiments described above are given as examples only and the invention is not limited to the specific details therein.

Note, in relation to the above described embodiments and in case of an optical pickup as shown in FIG. 1, the first NPS, NPS1 can be formed on for instance the collimator lens 14, or on a separate plate. The second NPS, NPS2 can be formed for instance on one of the lenses of the objective lenses 18, or on a separate plate.

It will further be appreciated that the NPS elements can be made from any suitable transparent material with the appropriate properties to compensate for some or all of the effects described above. The invention is not limited to PMMA, polycarbonate or BK7 glass.

Furthermore, it will be appreciated that the use of more than two NPS elements will enable the optical device to operate in a number of modes. For example, a compensator may be included in an optical pickup or recording device having two or more modes, for example for compensating for the effect of a change in wavelength in the first mode and compensating for a change in temperature in the second mode. This would require two additional NPS elements to be used in the optical device. Again, alternative combinations can be anticipated where the two operating modes compensate for effects of changes in wavelength, temperature, angle of incidence and polarisation.

Moreover, it would be possible to envisage optical systems where more than two effects are compensated for, each additional effect being compensated for by successively additional NPS elements.

Furthermore, in NPS1 and NPS2 the step heights are positive and negative (with respect to the outer zones) respectively. It should be appreciated that the step heights of either NPS1 or NPS2 could be positive or negative, depending on the function or compensation the separate elements are to perform.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical arrangement for interacting with a radiation beam, the optical arrangement comprising an optical system and a compensator, the compensator including a first optical element, the first optical element having a phase structure comprising stepped annular areas forming a non-periodic pattern of optical paths of different lengths, the compensator being arranged to generate:

a first wavefront deviation introduced by the variation of a first parameter during interaction of the radiation beam with the compensator, the first wavefront deviation being arranged to counteract a wavefront deviation introduced by the variation of the first parameter during interaction of the radiation beam with the optical system; and a second wavefront deviation introduced by the variation of a second, different, parameter during interaction of the radiation beam with the compensator, wherein the compensator further includes a second optical element formed from a different material than the first optical element and having a phase structure comprising stepped annular areas forming a non-periodic pattern of optical paths of different lengths, the second optical element being arranged to reduce said second wavefront deviation, wherein the annular areas of the first optical element are stepped by a step height of $h_j$ and the annular areas of the second optical element are stepped by a step height of $b_j$ and wherein the first optical element is arranged such that, for each said annular area, the step height $h_j$ is substantially equal to:

$$h_j = m_j \frac{\lambda}{n_1 - 1}$$

where $m_j$ is an integer, $\lambda$ the wavelength and $n_1$ is a refractive index of a first material from which the first optical element is made, and wherein the second optical element is arranged such that, for each said annular area, the step height $b_j$ is substantially equal to:

$$b_j = q_j \frac{\lambda}{n_2 - 1}$$

where $q_j$ is an integer, $\lambda$ the wavelength and $n_2$ a refractive index of a second material of which the second optical element is made.

2. The optical arrangement according to claim 1, wherein the first optical element and the second optical element have correspondingly arranged annular areas, and wherein the step heights $h_j$, $b_j$ are interrelated.

3. The optical arrangement according to claim 2, wherein the step heights $h_j$, $b_j$ are related by way of a substantially constant parameter K, the value of the constant parameter K depending on a compensating function of the respective optical elements.

4. The optical arrangement according to claim 3, wherein:

$$K = \frac{m_j}{q_j}.$$

5. The optical arrangement according to claim 3, wherein:

$$K \approx -\frac{\frac{1}{\lambda} - \frac{\frac{dn_2}{d\lambda}}{n_2 - 1}}{\frac{1}{\lambda} - \frac{\frac{dn_1}{d\lambda}}{n_1 - 1}},$$

and wherein the second parameter is a wavelength of the radiation beam, where $$\frac{dn_1}{d\lambda}$$

is a dispersion of the first material and $$\frac{dn_2}{d\lambda}$$

is a dispersion of the second material.

6. The optical arrangement according to claim 3, wherein:

$$K \approx -\frac{(n_2 - 1)\alpha_2 + \frac{dn_2}{dT}}{(n_1 - 1)\alpha_1 + \frac{dn_1}{dT}}$$

where $\alpha_1$ and $\alpha_2$ are the thermal expansion coefficients, and $$\frac{dn_1}{dT}$$

and $$\frac{dn_2}{dT}$$

are the temperature coefficients of refractive index, of the materials from which the first and second optical elements are formed, and wherein the second parameter is a temperature of the optical arrangement.

7. The optical arrangement according to claim 3, wherein:

$$K \approx -\frac{n_1}{n_2},$$

and wherein the second parameter is an angle of incidence of the radiation beam.

8. The optical arrangement according to claim 3, wherein:

$$K \approx -\frac{(n_1 - 1)\frac{dn_2}{dp}}{(n_2 - 1)\frac{dn_1}{dp}},$$

where $$\frac{dn_1}{dT}$$

and $$\frac{dn_2}{dp}$$

are the polarization coefficients of refractive index of the materials from which the first and second optical elements are formed, and wherein the second parameter is a polarization of the radiation beam.

9. The optical scanning device comprising the optical arrangement according to claim 1, the device being arranged for scanning an optical record carrier having an information layer using a radiation source.

* * * * *